United States Patent
Ng-Thow-Hing et al.

(10) Patent No.: US 9,079,306 B2
(45) Date of Patent: Jul. 14, 2015

(54) EVALUATION OF COMMUNICATION MIDDLEWARE IN A DISTRIBUTED HUMANOID ROBOT ARCHITECTURE

(75) Inventors: Victor Ng-Thow-Hing, Sunnyvale, CA (US); Thor List, New Haven, CT (US); Kristinn R. Thorisson, New Haven, CT (US); Joel Wormer, Mountain View, CA (US)

(73) Assignee: Honda Motor Co., Ltd., Tokyo (JP)

(*) Notice: Subject to any disclaimer, the term of this patent is extended or adjusted under 35 U.S.C. 154(b) by 1160 days.

(21) Appl. No.: 12/252,628

(22) Filed: Oct. 16, 2008

(65) Prior Publication Data

US 2009/0105879 A1     Apr. 23, 2009

Related U.S. Application Data

(60) Provisional application No. 60/981,804, filed on Oct. 22, 2007.

(51) Int. Cl.
  *G06F 19/00*  (2011.01)
  *B25J 9/16*  (2006.01)
  *G06N 5/04*  (2006.01)

(52) U.S. Cl.
  CPC ............. *B25J 9/1656* (2013.01); *G06N 5/043* (2013.01); *G05B 2219/33149* (2013.01); *G05B 2219/39251* (2013.01); *G05B 2219/39252* (2013.01)

(58) Field of Classification Search
  CPC .... B25J 9/1656; H04L 12/581; H04L 63/104; H04L 51/04; H04L 67/125; H04L 67/2871; H04L 2029/06054; H04L 12/2874; H04W 84/18; H04W 4/06; H04W 4/08; G06N 5/043; G05B 2219/39252; G05B 2219/39251; G05B 2219/33149

USPC ......... 700/245, 246, 250; 706/46, 49, 59, 53, 706/47, 48; 709/206; 712/28
See application file for complete search history.

(56) References Cited

U.S. PATENT DOCUMENTS 5,963,447 A * 10/1999 Kohn et al. ................. 700/49
7,137,107 B1 * 11/2006 Brown ....................... 717/137
(Continued)

FOREIGN PATENT DOCUMENTS

| JP | 2001-016292 | 1/2001 |
| JP | 2001-285287 | 10/2001 |

(Continued)

OTHER PUBLICATIONS

PCT International Search Report and Written Opinion, PCT/US2008/080108, Dec. 19, 2008, 9 pages.

(Continued)

*Primary Examiner* — Thomas G Black
*Assistant Examiner* — Sze-Hon Kong
(74) *Attorney, Agent, or Firm* — Fenwick & West LLP; Mark E. Duell (57) ABSTRACT

A publish-subscribe architecture based blackboard system for selecting and exchanging selected information among a plurality of processing modules using filters for implementing conditions described in a procedural language to reduce the amount of information transmitted between the processing modules. More than one filter may be dynamically installed in a message hub to select and collect the published information to be sent to a certain subscribing module. By using the procedural language to describe the filters, the message hub can more intelligently select the information to be sent to the subscribing module. This reduces the amount of information transmitted via communication channels. Further, the subscribing module may be relieved from the task of filtering the information received from the message hub, allowing the subscribing module to devote more resources to other operations.

20 Claims, 5 Drawing Sheets

(56) References Cited

U.S. PATENT DOCUMENTS

| | | | |
|---|---|---|---|
| 7,177,859 B2* | 2/2007 | Pather et al. | 1/1 |
| 7,184,994 B2* | 2/2007 | Bella et al. | 706/49 |
| 7,266,826 B2* | 9/2007 | Katiyar et al. | 719/316 |
| 7,292,911 B2* | 11/2007 | Aoki et al. | 700/245 |
| 7,313,534 B2* | 12/2007 | Scheer | 705/7.26 |
| 7,437,204 B2* | 10/2008 | Lev-Ami et al. | 700/96 |
| 7,523,198 B2* | 4/2009 | Wu et al. | 709/224 |
| 7,706,895 B2* | 4/2010 | Callaghan | 700/17 |
| 7,769,487 B2* | 8/2010 | Ayers et al. | 700/245 |
| 7,813,835 B2* | 10/2010 | Fujita et al. | 700/245 |
| 7,853,357 B2* | 12/2010 | Sawada et al. | 700/250 |
| 7,966,093 B2* | 6/2011 | Zhuk | 700/246 |
| 8,027,280 B2* | 9/2011 | Ganesh | 370/310 |
| 8,145,492 B2* | 3/2012 | Fujita | 704/270 |
| 8,200,700 B2* | 6/2012 | Moore et al. | 707/791 |
| 8,301,701 B2* | 10/2012 | Goodman et al. | 709/206 |
| 8,347,088 B2* | 1/2013 | Moore et al. | 713/166 |
| 8,402,101 B2* | 3/2013 | Callaghan | 709/206 |
| 8,812,684 B1* | 8/2014 | Hood et al. | 709/227 |
| 2002/0077726 A1* | 6/2002 | Thorisson | 700/246 |
| 2002/0143669 A1* | 10/2002 | Scheer | 705/28 |
| 2003/0056252 A1* | 3/2003 | Ota et al. | 901/47 |
| 2003/0200347 A1* | 10/2003 | Weitzman | 709/310 |
| 2003/0217171 A1* | 11/2003 | Von Stuermer et al. | 709/231 |
| 2004/0006424 A1* | 1/2004 | Joyce et al. | 701/207 |
| 2005/0005266 A1 | 1/2005 | Datig | |
| 2005/0222810 A1* | 10/2005 | Buford et al. | 702/183 |
| 2006/0195226 A1* | 8/2006 | Matsukawa et al. | 700/245 |
| 2006/0265626 A1 | 11/2006 | Thorisson et al. | |
| 2007/0043803 A1* | 2/2007 | Whitehouse et al. | 709/201 |
| 2007/0244904 A1* | 10/2007 | Durski | 707/10 |
| 2008/0005086 A1* | 1/2008 | Moore | 707/3 |
| 2008/0058987 A1* | 3/2008 | Ozick et al. | 700/250 |
| 2008/0244091 A1* | 10/2008 | Moore et al. | 709/246 |
| 2009/0063266 A1* | 3/2009 | Blanch et al. | 705/14 |
| 2010/0131081 A1* | 5/2010 | Brown et al. | 700/21 |
| 2010/0205044 A1* | 8/2010 | Scheer | 705/10 |
| 2013/0104251 A1* | 4/2013 | Moore et al. | 726/30 |

FOREIGN PATENT DOCUMENTS

| | | |
|---|---|---|
| JP | 2004-512602 | 4/2004 |
| JP | 2006-344017 | 12/2006 |

OTHER PUBLICATIONS

Honda Motor Co., Ltd., "Asimo year 2000 model," 2000, 2 pages [online] [Retrieved on Jul. 28, 2009] Retrieved from the internet <URL:http://world.honda.com/ASIMO/technology/spec.html>.
Microsoft Corporation, "Microsoft robotics studio," 2006, 1 page [online] [Retrieved on Jul. 28, 2009] Retrieved from the internet <URL:http://msdn.microsoft.com/en-us/robotics/default.aspx>.
Baillie, J., "Universal programming interfaces for robotic devices," in Joint Conf. on Smart objects and ambient intelligence, 2005, pp. 75-80.
Bischoff, R., et al., "Demonstrating the humanoid robot HERMES at an exhibition: A long-term dependability test," in IEEE/RSJ International Conference on Intelligent Robots and Systems (IROS '02); Workshop on Robots at Exhibitions, 2002, 7 pages.
Breazeal, J C., et al., "How to build robots that make friends and influence people," in IEEE/RSJ International Conference on Intelligent Robots and Systems (IROS '99), 1999, 6 pages.
Brooks, R., "A robust layered control system for a mobile robot," IEEE Journal of Robotics and Automation, vol. RA-2, Apr. 14-23, 1986, pp. 1-25.
Ceravola, A., et al., "Researching and developing a real-time infrastructure for intelligent systems—evolution of an integrated approach," Robitics and Autonomous Systems, vol. 56, No. 1, pp. 14-28, 2008.
Collett, T. H., et al., "Player 2.0: Toward a practical robot programming framework," in Australasian Conf. On Robotics and Automation (ACRA), 2005, 8 pages.
Drumwright, J E., et al., "The task matrix: An extensible framework for creating versatile humanoid robots," in Proceedings of the IEEE International Conference on Robotics and Automation 2006, 8 pages, Orlando, FL, USA.
Gat, E., "On three-layer architectures," in Artificial Intelligence and Mobile Robots, R. P. Bonnasso and R. Murphy, Eds. AAAI Press, 1998, 11 pages.
Gerkey, B. P., et al., "The player/stage project: Tools for multi-robot and distributed sensor systems," in International. Conf. On Advanced Robotics (ICAR), 2003, pp. 317-323.
Gockley, R., et al., "Designing robots for long-term social interaction," in IEEE/RSJ International Conference on Intelligent Robots and Systems (IROS '05), 2005, pp. 2199-2204.
Hauser, K., et al., "Multi-modal motion planning for a humanoid manipulation task," in International Symposium on Robotics Research (ISRR 2007), 2007, 12 pages.
Hayes-Roth, B., "A blackboard architecture for control," Artificial Intelligence, Jul. 1985, pp. 251-321, vol. 26, No. 3.
Kanehiro, F., et al., "Openhrp: Open architecture humanoid robotics platform," The International Journal of Robotics Research, vol. 23, No. 2, pp. 155-165, 2004.
Kortenkamp, D., et al., "Robotic systems architectures and programming," in Handbook of Robotics, B. Siciliano and O. Khatib, Eds. Springer, 2008, ch. 8, pp. 187-206.
Laxton, B., et al., "Leveraging temporal, contextual and ordering constraints for recognizing complex activities in video," in Computer Vision and Pattern Recognition (CVPR 2007), 2007, 8 Pages.
Lerusalimschy, R., et al., "Lua 5.1 Reference Manual", Lua.org, 2006, pp. 1-103.
Lerusalimschy, R., et al., "Lua 5.1 Reference Manual", Section 2.4.4, Lua.org, Aug. 2006, (available at http://www.lua.org/manual/5.1/).
Lerusalimschy, R., "Programming in Lua (first edition)," Part 1 Sections 4 and 7, Lua.org, Dec. 2003, (available at http://www.lua.org/pil/).
Lerusalimschy, R., "Programming in Lua (second edition)," Chapter 4 and 7, Lua.org, 2006, pp. 24-34 and 55-62.
Murphy, J K., "Dynamic bayesian networks: Representation, inference and learning," Ph.D. dissertation, UC Berkeley, 2002, 281 pages.
Nakaoka, J S., et al., "Leg motion primitives for a dancing humanoid robot," in IEEE 2004 International Conference on Robotics and Automation, 2004, 6 pages.
Ng-Thow-Hing, V., et al., "The memory game: Creating a human robot interactive scenario for asimo," in To appear in IEEE/RSJ International Conference on Intelligent Robots and Systems (IROS '08), 2008, pp. 779-786.
Ng-Thow-Hing, V., et al., "Expanding task functionality in established humanoid robots," in IEEE-RAS 7th International Conference on Humanoid Robots, 2007, 7 pages.
Nilsson, N. "Shakey the robot. Technical Report 323", Chapter 8, Apr. 1984, pp. 65-80, SRI, Menlo Park, CA.
Sivaharan, T., et al., "GREEN: A Configurable and Re-configurable Publish-Subscribe Middleware for Pervasive Computing," Lecture Notes in Computer Science, 2005, pp. 732-749, vol. 3760.
Smed, J., et al., "Algorithms and Networking for Computer Games," Chapters 8 and 9, 2006, pp. 171-211, John Wiley & Sons Inc.
Stilman, M., et al., "Learning object models for whole body manipulation," in IEEE-RAS 7th International Conference Oil Humanoid Robots (Humanoids 2007), 2007, 6 pages.
Tanenbaum, A. S., et al. "Distributed Systems: Principles and Paradigms," Sections 2.4 and 2.5, 2002, pp. 99-134, New York: Prentice-Hall.
Thorisson, K., et al., "Constructionist Design Methodology for Interactive Intelligences," A.I. Magazine, vol. 25, No. 4, pp. 70-90, 2004.
Thorisson, K., "A mind model for multimodal communicative creatures and humanoids," International Journal of Applied Artificial Intelligence, vol. 13, No. 4-5, pp. 449-486, 1999.
Thorisson, K., et al., "Whiteboards: scheduling blackboards for semantic routing of messages & streams," in AAAI-05 Workshop on Modular Construction of Human-Like Intelligence, 2005, pp. 8-15.
Thorisson, K., et al., "OpenAIR 1.0 Specification," Reykjavic University, 2007, pp. 1-12.

(56) References Cited

OTHER PUBLICATIONS

Thorisson, K., et al., "Artificial Intelligence in Computer Graphics: A Constructionist Approach," Computer Graphics, Feb. 2004, pp. 26-30.

Wagner, D., et al., "Artoolkitplus for pose tracking on mobile devices," in Computer Vision Winter Workshop 2007, Feb. 6-8, 2007, 8 pages, sl. Lambrecht, Austria.

Zhang, J L., et al., "Emma: an automated intelligent actor in e-drama," in ACM International Conference on Intelligent User Interfaces, 2008 (IUI 2008), pp. 409-412.

Japanese Patent Office, Notice of Reasons for Rejection, Japanese Patent No. 2010-531136, Apr. 2, 2013, ten pages.

Matsusaka, Y. et al., "Design and implementation of Data Sharing Architecture for Multi-Functional Robot Development," *Journal of Institute of Electronics, Information and Communication Engineers*, May 1, 2003, pp. 318-329, vol. J86-D, No. 5.

Japanese Patent Office, Notice of Reasons for Rejection, Japanese Patent No. 2010-531136, Oct. 2, 2012, nine pages.

Japanese Patent Office, Office Action, Japanese Patent Application No. 2010-531136, Nov. 26, 2013, five pages.

\* cited by examiner

EVALUATION OF COMMUNICATION MIDDLEWARE IN A DISTRIBUTED HUMANOID ROBOT ARCHITECTURE

CROSS-REFERENCE TO RELATED APPLICATIONS

This application claims priority under 35 U.S.C. §119(e) to U.S. Provisional Patent Application No. 60/981,804 entitled "Design and Evaluation of Communication Middleware in a Distributed Humanoid Robot Architecture" filed on Oct. 22, 2007, which is incorporated by reference herein in its entirety.

FIELD OF THE INVENTION

This disclosure is related to a method and system for filtering messages at a blackboard message hub before sending the messages to a subscribing module.

BACKGROUND OF THE INVENTION

Robots may require processing of information from various sources to interact with environments. For example, a robot may obtain sensory measurements from sensors which are processed by one or more processing modules to extract useful features or reconstruct the surrounding environment. Information of the extracted features or the reconstructed environment may then be accessed by other processing modules to perform other meaningful tasks such as controlling the effectors of the robot (e.g., motors, speakers, and actuators). Sometimes, a series of processing must be performed at different processing modules in a complex sequence to perform a meaningful task.

Modular design approaches may be used to implement a robot that performs various tasks. In this approach, a complex task may be broken down to smaller and more manageable tasks. Then multiple processing modules may be designed and developed to address the smaller tasks that are part of the complex task. A series of processing may be performed at different processing modules using information generated by other processing modules. The modular design approaches may also reduce duplicative efforts in programming a robot because a processing module may be reusable to perform more than one task.

In robots with such multiple modules, the information must be exchanged in an efficient and coordinated manner. As the number of modules increase and the tasks become more complicated, the amount of information exchanged between the modules also increases. One way to manage the increased number of processing modules and the increased amount of information exchanged is a publish-subscribe architecture based blackboard system. In the blackboard system, information from a source is not sent directly to a receiving module. Instead, the information from a source is stored and made accessible (i.e., published) on a shared repository. The receiving module subscribes to the published information from the shared repository. The receiving module may also publish information on the shared repository that may be subscribed by other modules.

The computational capabilities of computers in a robot are usually limited because of constraints such as energy consumption and heat management. Therefore, instead of placing all the modules in a central computer, modules may be distributed across multiple computers or hardware devices located in different parts of the robot. By distributing the modules, the computational demands of a task can be shared across multiple computers or hardware devices. Each module may be responsible for less demanding portions of tasks; and therefore, avoid or alleviate excessive computational delays at the central computer. Further, different software environments, operating systems and programming languages may be used for each module in the distributed system to increase flexibility of the robot system.

SUMMARY OF THE INVENTION

Embodiments provide a method, a system and a computer readable storage medium for controlling a robot based on a publish-subscribe architecture in a distributed system where processing modules are implemented on multiple computers distributed in the robot. The robot comprises a plurality of publishing modules that generate information. Each publishing module sends the information to a message hub where the information is indexed and stored for sharing. A plurality of subscribing modules subscribe to the information published on the message hub and process the information to perform various useful tasks. The message hub includes filters for collecting and selecting a subset of the published information that matches conditions described in a procedural language. The procedural language can describe algorithms consisting of sequential steps that can contain control flow statements, instructions or function calls that include loops, recursions and branching operations.

In one embodiment, filter definitions are used for installing the filters in the message hub. The filter definitions are described in the procedural language that is compiled or interpreted by the message hub to instantiate and install the filters.

In one embodiment, the filter definitions are described in a scripting language such as Lua, Tcl or Perl. Describing the filter conditions in an interpretable scripting language is advantageous because the filters may be instantiated and installed on the message hub dynamically in real-time without a compiling process.

In one embodiment, the message hub comprises a blackboard manager for classifying and indexing the received information into first type of information and second type of information. The first type of information may be stored in a first shared memory and the second type of information may be stored in a second shared memory.

In one embodiment, the filter definition is stored in the subscribing module and sent to the message hub after installation. By storing the filter definition in the subscribing module, a plug-in framework may be implemented that allows a subscribing module to customize the information that the subscribing module needs to receive from the message hub.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of this disclosure can be readily understood by considering the following detailed description in conjunction with the accompanying drawings.

DETAILED DESCRIPTION OF THE INVENTION

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Embodiments provide a method, a device and a computer readable storage medium for selecting and exchanging information among a plurality of processing modules using filters for matching information against conditions described in a procedural language. The amount of information transmitted between the processing modules is reduced by collecting and sending only a subset of information matching the conditions enforced by the filters. More than one filter may be installed in a message hub to tailor the subset of information available on the message hub for sending to multiple processing modules. By using the procedural language to describe the conditions, the message hub can collect and select the subset of information more intelligently and flexibly. Further, the subscribing module may be relieved from the task of filtering the information received from the message hub, allowing the subscribing module to devote more resources to other operations.

Publishing modules and subscribing modules are part of a publish-subscribe architecture. A publishing module is a processing module that generates information and makes available the generated information for sharing with other processing modules on a blackboard message hub. A subscribing module is a counterpart of the publishing module that receives the information generated by the publishing module via the blackboard message hub. The publishing module and the subscribing module are not mutually exclusive. A processing module may receive information from another module (therefore, functioning as a subscribing module) and also generate information for sharing with other modules (therefore, functioning as a publishing module).

A message hub is a central repository for storing information received from publishing modules in a publish-subscribe architecture. The message hub may be implemented using a shared memory in a blackboard system. The message hub may be implemented by running commercially available software products such as Psyclone middleware from Communicative Machines Inc. of New York, N.Y. on a conventional computer. Alternatively, a dedicated computer may be designed and deployed as the message hub.

A procedural language is a programming language that allows implementation of control flow using at least branching, loop and recursion operations. A language that lacks control flow statements such as loops or function calls and consists only of conditional Boolean expressions is excluded from definition of the procedural language herein. The procedural language includes, among others, interpretable scripting languages such as Lua, Tcl, Perl, Python, Java, and C#.

Overview of System Architecture

Figure 1:
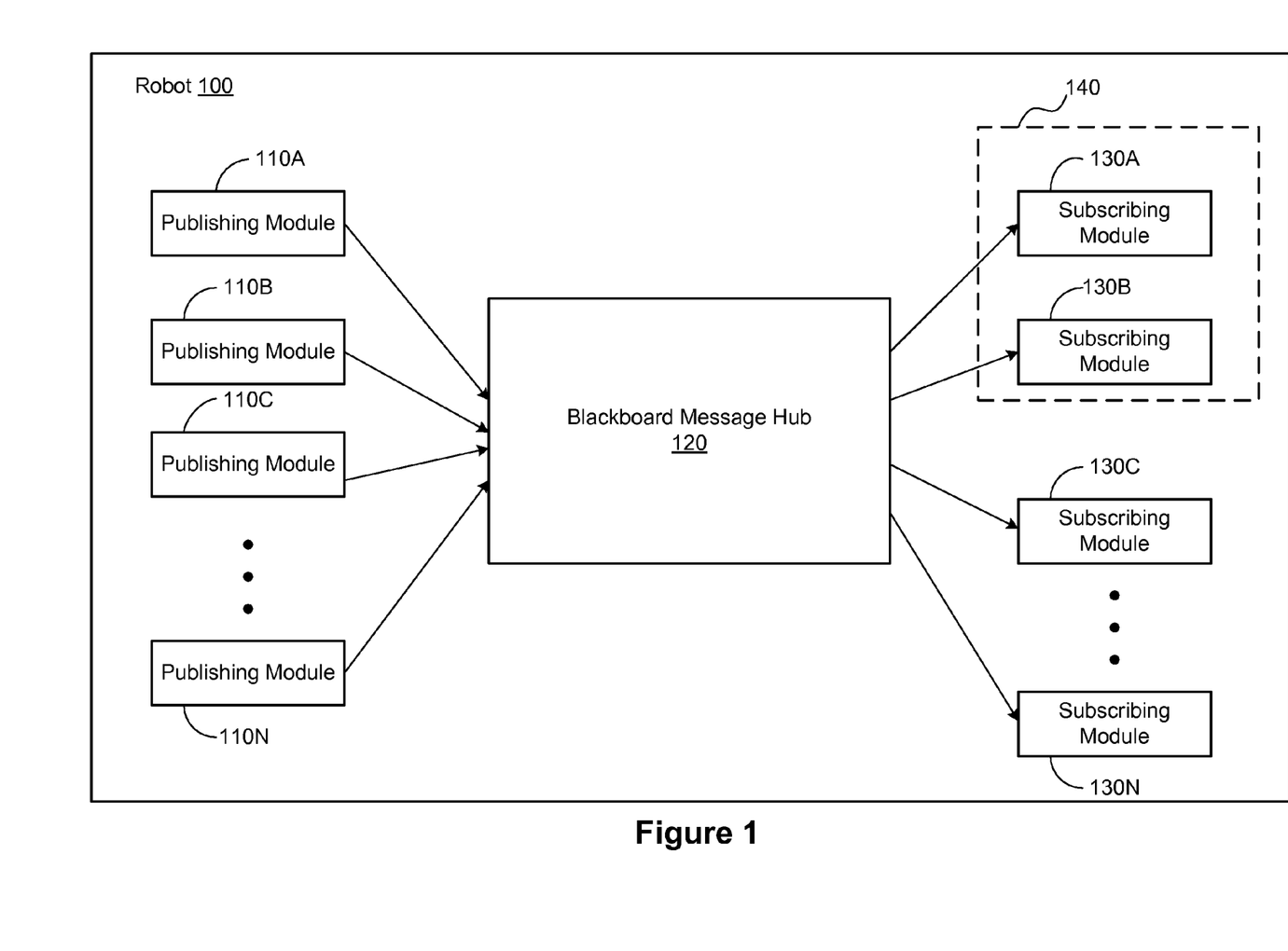
FIG. 1 is a diagram illustrating a robot including a publish-subscribe architecture based blackboard system, according to one embodiment.

FIG. 1 is a diagram illustrating a robot 100 including a publish-subscribe architecture based blackboard system, according to one embodiment of the present invention. The robot 100 includes, among other components, publishing modules 110A through 110N (hereinafter collectively referred to as "the publishing modules 110"), a blackboard message hub 120, and subscribing modules 130A through 130N (hereinafter collectively referred to as "the subscribing modules 130"). The publishing modules 110 process information and send the information to the blackboard message hub 120 for sharing with other modules. The storing of information for sharing with other modules is hereinafter referred to as "publishing." The publishing modules 110 include the information to be published in messages transmitted to the blackboard message hub 120. Each subscribing module 130 then receives messages including the information it subscribes to from the blackboard message hub 120. The receiving of information tailored to the subscribing module 130 is hereinafter referred to as "subscribing."

The publishing modules 110 may perform various types of operation, including among others, localize and identify objects in a video image, identify poses taken by a human character in a video image, perform speech recognition, generate motion plans, and perform text to speech conversion. The publishing modules 110, in part or in their entirety, may be embodied in hardware, software, firmware or any combinations thereof. One or more publishing modules 110 may be located on the same computer as the blackboard message hub 120. Alternatively, all the publishing modules 110 may be implemented on a hardware device separate and distinct from the computer embodying the blackboard message hub 120.

Likewise, the subscribing modules 130 may also be various types of processing modules receiving information to perform various operations as described above for the publishing modules 110. The subscribing modules 130 may overlap with the publishing module 110, and may also publish information for sharing. Like the publishing modules 110, one or more subscribing modules 130 may be located on the same computer as the blackboard message hub 120. Alternatively, all the subscribing modules 130 may be implemented in a hardware device separate and distinct from the computer embodying the blackboard message hub 120.

The blackboard message hub 120 is a centralized message hub that selects and collects information generated by the publishing modules 110. The blackboard message hub 120 also sends the information to the subscribing modules 130. In one embodiment, the blackboard message hub 120 is, in part or in its entirety, implemented as a computer running a Psyclone middleware available from Communicative Machines Inc. of New York, N.Y. The blackboard message hub 120 stores information received from the publishing modules 110, detects the information matching certain conditions, and sends the detected information to the subscribing modules 140, as described below in detail with reference to FIG. 2.

Some of the publishing modules 110 and the subscribing modules 130 may be implemented on the same computer that embodies the blackboard message hub 120. In such case, the information between the modules 110, 130 and the blackboard message hub 120 may be exchanged directly through shared memory.

In the example of FIG. 1, the subscribing modules 130A, 130B may be part of a mechanism 140 for controlling the effectors of the robot. The effectors may be various devices including, among others, motors, actuators and speakers that cause real-world events. The subscribing module 130A, for example, may generate control signals to perform the task of grabbing an object. On the other hand, the subscribing module 130B, for example, may generate control signals to perform gaze operation on a moving object. Other subscribing modules 130C to 130N may process the information that is published on the blackboards 248, 252 to generate other background information to support operations by the subscribing modules 130A and 130B.

Other publishing modules 110 and the subscribing modules 130 may be implemented on computers or hardware devices distributed across various parts of the robot 100. In one embodiment, messages including information to or from the blackboard message hub 120 may be sent in TCP/IP (Transmission Control Protocol/Internet Protocol) packets via dedicated sockets. In another embodiment, UDP (User Datagram Protocol) is used in place of or in conjunction with TCP/IP to communicate the messages to or from the blackboard message hub 120. The messages may be transmitted to and from the blackboard message hub 120 in accordance with the protocol set forth in Kristinn R. Thorisson et al., "OpenAIR 1.0 Specification," Reykjavic University (2007), which is incorporated by reference herein in its entirety.

The information published by the publishing modules 110 may be discrete data (e.g., an image) or a continuous stream of data (e.g., a video stream or sound stream). The published information includes, among others, raw information generated by internal sensors or external sources, and information processed by other publishing modules 110. Likewise, the information subscribed by the subscribing module 130 may be discrete data or a continuous stream of data. In one embodiment, dedicated channels are established between the publishing modules 110, the subscribing modules 130 and the blackboard message hub 120 to convey the information for publishing or subscription.

Example Blackboard Message Hub

Figure 2:
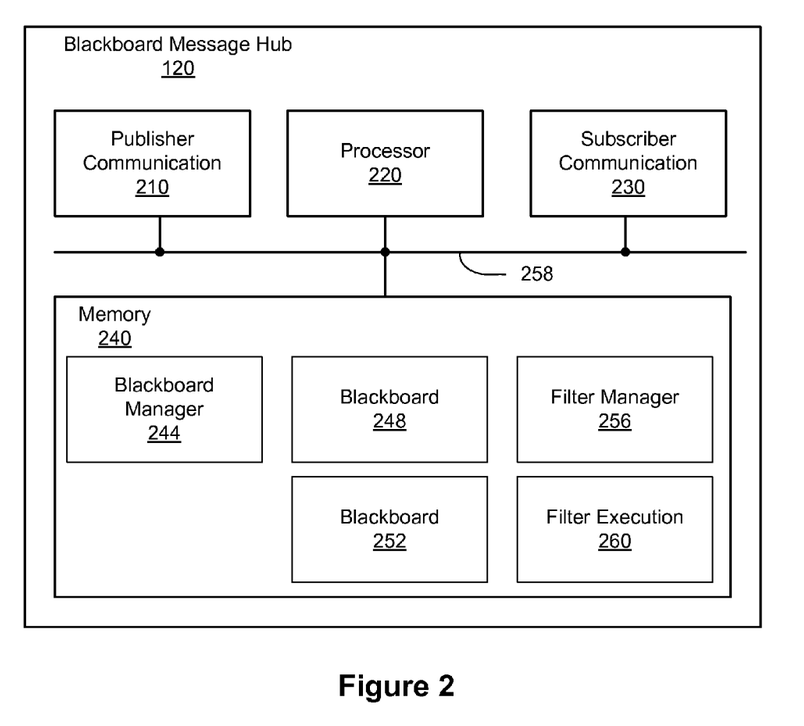
FIG. 2 is a block diagram of a blackboard message hub according to one embodiment.

FIG. 2 is a block diagram of a blackboard message hub 120 according to one embodiment of the present invention. The blackboard message hub 120 includes, among other components, a publisher communication module 210, a processor 220, a subscriber communication module 230, and a memory 240. The blackboard message hub 120 also includes a bus 258 connecting various components of the blackboard message hub 120. The publisher communication module 210 and the subscriber communication module 230 communicate with the publishing modules 110 and the subscribing modules 130, respectively. In one embodiment, the publisher communication module 210 and the subscriber communication module 230 are combined into a single communication module. As set forth above with reference to FIG. 1, the communication to and from the blackboard message hub 120 may be established, for example, using TCP/IP or UDP.

The processor 220 processes data signals and may comprise various computing architectures such as a complex instruction set computer (CISC) architecture, a reduced instruction set computer (RISC) architecture, or an architecture implementing a combination of instruction sets. Although only a single processor is shown in FIG. 2, multiple processors may be included. The processor 220 may comprise an arithmetic logic unit, a microprocessor, a general purpose computer, or some other information appliance equipped to transmit, receive and process data signals from the memory 240, the publisher communication module 210, or the subscriber communication module 230.

The memory 240 stores various software components including, among others, a blackboard manager 244, blackboards 248 and 252, a filter manager 256 and a filter execution module 260. The blackboard manager 244 classifies and indexes information published by the publishing modules 110 to allow each subscribing module 130 to subscribe to different information. The published information may, for example, be indexed by timestamps, a frame count, and coordinates in a three-dimensional space. The classification and indexing of the information are later used by filters 310 to collect and select subsets of the information to be sent to each subscribing module 130 as described below in detail. After classifying and indexing, the blackboard manager 244 stores the information in one of the blackboards 248, 252 or both blackboards 248, 252.

Figure 3A:
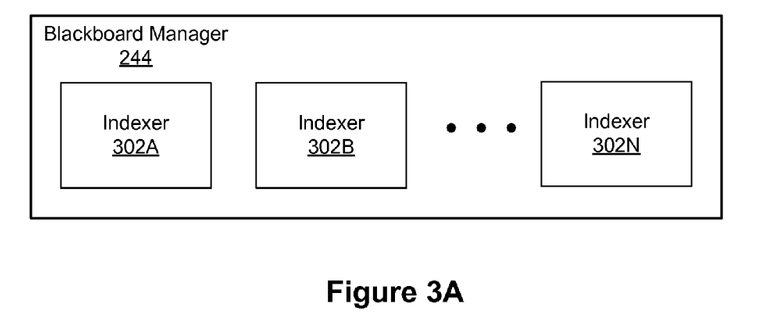
FIG. 3A is a block diagram illustrating a blackboard manager in the blackboard message hub according to one embodiment.

FIG. 3A is a block diagram illustrating a blackboard manager 244 according to one embodiment. The blackboard manger 244 may include multiples indexers 302A through 302N (hereinafter collectively referred to as "the indexers 302"). The indexers 302 index the published information so that corresponding filters 310 in the filter execution module 260 can collect and select information as subscribed information to be sent to the subscribing module 130. Each indexer may be instantiated and installed on the blackboard manager 244 when a filter definition 444 is received from a newly installed subscribing module 130. If an indexer 302 installed on the blackboard manager 244 already provides indexing needed for a newly installed filter 310, generation of a new indexer may be omitted to avoid duplicative indexers from crowding the blackboard manager 244. Alternatively, a newly installed indexer can replace a pre-existing indexer in the blackboard manager 244.

In the embodiment of FIG. 2, two blackboards 248, 252 are provided on the memory 240. The two blackboards 248, 252 may be assigned to store different types of data. For example, the blackboard 248 may store information related to objects surrounding the robots such as identification of the objects and the coordinates of these objects. On the other hand, the blackboard 252 may store information associated with planning and executing specific tasks by the robot. Although the two blackboards 248, 252 are illustrated in FIG. 2 as being implemented on the same memory or computer, each blackboard may be implemented on a separate memory or computer. Further, more than two blackboards may be used to store more information or expand the functionality of the robot. In one embodiment, the blackboards 248, 252 are implemented using "whiteboard" of Psyclone middleware.

The filter manager 256 receives the filter definition 444 from the subscribing module 130 and installs filters 310 on the filter execution module 260. The filter definition 444 describes the information to be subscribed by the subscribing module 130. In one embodiment, the filter definition 444 is described in a procedural language including scripting languages. After the subscribing module 130 is installed on the blackboard system, the filter manager 256 parses the received filter definition 444 and generates one or more filters 310 for the subscribing module 130. In one embodiment, the filters 310 are generated dynamically in real-time. In other words, the filters 310 are embodied as plug-ins that can be installed on the filter execution engine 260. The generated filters are installed on the filter execution module 260, as described below in detail with reference to FIG. 3B. The filter manager 256 may also receive update requests from the subscribing module 130 to modify the filters 310 associated with the requesting subscribing module 130. In response, the filter manager 256 may modify filters or reinstall the filters to change the subscribed information. Such updating of the filters 310 may also be performed in real-time without restarting the blackboard message hub 120.

Figure 3B:
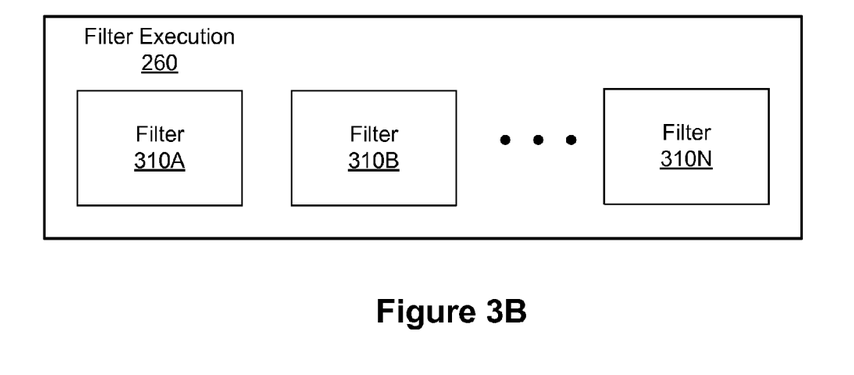
FIG. 3B is a block diagram of a filter execution module in the blackboard message hub according to one embodiment.

FIG. 3B is a block diagram of a filter execution module 260 according to one embodiment. The filters 310A through 310N (hereafter collectively referred to as "the filters 310") generated by the filter manager 256 are then installed on the filter execution module 260. One or more of the filters 310 may be associated with one subscribing module 130. The filter execution module 260 monitors the information published on the blackboards 248, 252. The filter execution module 260 then collects and selects published information that matches the conditions as specified by the filters 310. The filter execution engine 260 sends the selected information to the subscribing modules 130 associated with the filters 310.

Example Subscribing Module

Figure 4:
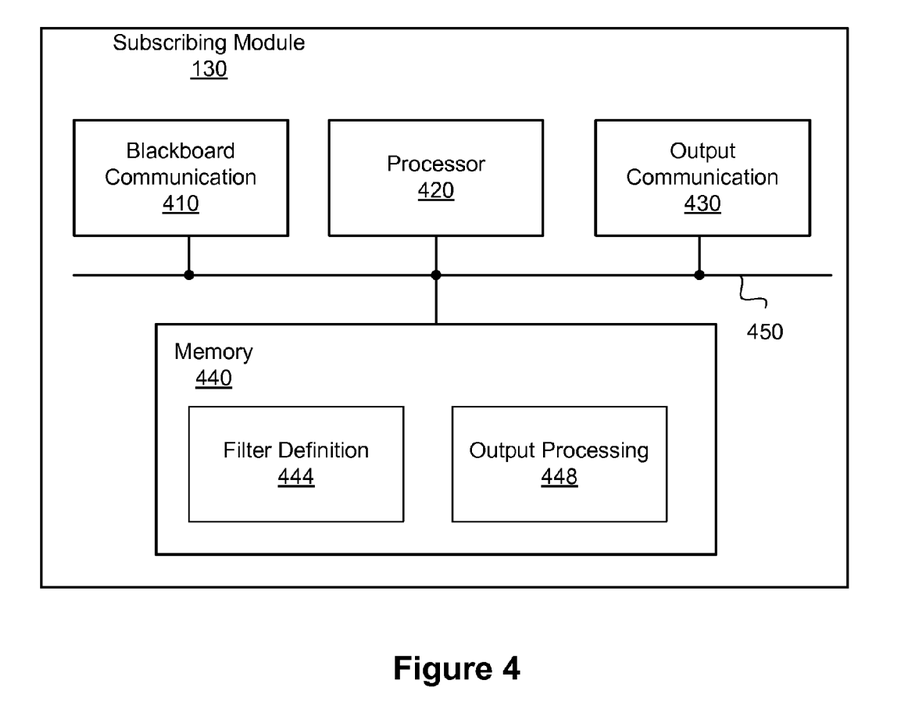
FIG. 4 is a block diagram of a subscribing module according to one embodiment.

FIG. 4 is a block diagram of a subscribing module 130 according to one embodiment. The subscribing module 130 includes, among other components, a blackboard communication module 410, a processor 420, an output communication module 430, a memory 440, and a bus 450. The bus 450 connects various components of the subscribing module 130.

The blackboard communication module 410 communicates with the blackboard message hub 120 to receive the subscribed information from the blackboard message hub 120. The blackboard communication module 410 also sends the filter definition 444 to the blackboard message hub 120. As described above with reference to FIG. 1, the communication with the blackboard communication module 410 may be performed, for example, in TCP/IP or UDP.

The processor 420 may be any conventional or dedicated central processing module that processes data signals. The processor 420 may comprise various computing architectures such as a complex instruction set computer (CISC) architecture, a reduced instruction set computer (RISC) architecture, or an architecture implementing a combination of instruction sets. Although only a single processor is shown in FIG. 4, multiple processors may be included. The processor 420 may comprise an arithmetic logic unit, a microprocessor, a general purpose computer, or some other information appliance equipped to transmit, receive and process data signals from the memory 440, the blackboard communication module 410, or the output communication module 430.

The memory 440 stores, among others, the filter definition 444 and the output processing module 448. The filter definition 444 describes one or more filters 310 to be instantiated and installed on the filter execution module 260 of the blackboard message hub 120 to collect and select the subscribed information. The filter definition 444 is one or more statements, instructions or functions calls for implementing conditions in a procedural language defining one or more filters to be installed on the filter execution module 260. The procedural language is any language that is capable of describing statements, instructions or function calls for performing branching, looping and recursions operations. By using a procedural language, the conditions to be enforced by the filters 310 can be defined flexibly and completely to remove any unnecessary or redundant information from being included in the subscribed information. The filtering of unnecessary or redundant information at the blackboard message hub also means that the subscribing module 130 is relieved of the task to perform the filtering operation on the information received from the blackboard message hub. Accordingly, the waste of resources at the subscribing module 130 for filtering out unnecessary or redundant information is reduced or eliminated. Further, a user may also conveniently manage the subscribed information by using a procedural language that the user is already familiar with.

In one embodiment, the filter definition 444 or parameters associated with the filter definition 444 is updated or modified by the output processing module 448. The output processing module 448 may need to subscribe to different information depending on, for example, the context of operation (e.g., the robot is in a room or the robot is outside a room). If such needs arise, the updated or modified filter definition 444 is sent to the blackboard message hub 120 to modify or reinstall the filters 310 according to the updated filter definition 444. The modification or the reinstallation of the filters 310 may be performed dynamically in real-time so that the filter updating procedure does not interrupt other operations performed at the blackboard message hub 120 or the processing module 110, 130.

The output processing module 448 performs various processing based on the information received from the blackboard message hub 120. The processing performed at the output processing module 448 may include, among others, motion planning, extraction and identification of objects from video image, voice synthesis, speech recognition and various other types of signal processing. Information or signal generated at the output processing module 448 is then sent to the output communication module 430 for transmission to other components of the robot 100.

The output communication module 430 of the subscribing module 130 communicates with the blackboard message hub 120 or the effectors of the robot. The output communication module 430 of the subscribing module 130 may also communicate directly with other processing modules, bypassing the blackboard message hub 120.

In one embodiment, the filters 310 and indexers 302 associated with a subscribing module 130 are removed when the subscribing module 130 is uninstalled from the robot 100 or deactivated. In this way, the resources of the blackboard message hub 120 may be freed up for installation of another subscribing module.

Communications Between Processing Modules and Blackboard Message Hub

In one embodiment, the information to and from the blackboard message hub 120 are encapsulated into messages that are instantiated from extendible classes. Specifically, the messages including the published or subscribed information may be instances of subclasses extending from a base class. The base class may include essential attributes for transmitting messages, for example, sender of the message and the time the information was sent. An extended subclass may include specialized attributes such as position or location of a physical object in addition to the essential attributes. By instantiating the messages from extendible classes, the message including the published or subscribed information can be represented in a standardized format that can be readily understood by users and addressed by the processing modules. The following Table 1 illustrates the essential attributes in an example base class.

TABLE 1

| ATTRIBUTES | DESCRIPTION | COMMENTS |
| --- | --- | --- |
| Type | Dot-delimited type | Example: Input.Audio.Raw |
| ID | Global unique identification tag | |
| From | Name of a processing module that published the message | |
| To | Name of blackboard to receive the message when there are multiple blackboards installed | |
| Cc | Name of processing module(s) to receive a copy of the message | |
| PostedTime | Timestamp when the message left the processing module which published the information | Example: 2004.02.0001 12:20:41:129 |
| ReceivedTime | Timestamp when the blackboard received the message | Example: 2004.02.0001 12:20:40:128 |
| Content and language | The content of the message indicates what the module wants to convey by publishing the information. The language that the Content is expressed, for example, XML, Lisp, Python, HTML, Java Script, or unspecified. | The Content can be autoparsed by the blackboard manager to recognize the message type and content format. |
| InReplyTo | A single reference to the message to which this message is a reply, grouped by the Reference tag | |
| Stored | Name of the blackboard where the message is stored | |
| History | References to past messages relevant to the current message. | |
| Comment | Human-readable comments | |

An example of the message instantiated from a subclass is CMObject. CMObject represents messages for physical objects identified from sensor inputs or created as virtual objects by a computer algorithm. CMObject includes attributes listed in Table 2 in addition to the basic attributes described in Table 1.

TABLE 2

| ATTRIBUTES | DESCRIPTION | COMMENTS |
| --- | --- | --- |
| Position | Coordinate of the object in a virtual or real space | Example: (3.5, 3.2, 7.0) |
| Orientation | Orientation of the object in a virtual or real space | Example: (0, 0, 0 1) |
| Training | Information used for teaching certain CMObject to the robot | Example: Victor-mug-001.png, Victor-mug-002.png |

CMObject class may also be extended to further subclasses such as Tabletop or Mug class. Tabletop and Mug classes are associated with messages including information about a tabletop and mug, respectively. Tabletop class may include additional attributes such as lengths and widths in addition to the attributes listed in Tables 1 and 2. On the other hand, Mug class may include additional attributes such as bottom radius and height.

Example Filter Definition

In one embodiment, the filter definition 444 is described in a scripting language Lua. The filter 310 installed by this filter definition 444 is used for checking if the position of an object falls within the area of a table. The filter loops through each of the four table edges and performs a Boolean check to see if the point lies on side corresponding to the table. If all four conditions are true for each edge, the filter returns true and allows the object to be sent to the subscriber module. Following Table 3 includes a sample pseudocode for a filter performing such operation. In the following example, the subscribing module is assumed to already have information about the table corners, for example, coordinates identified by (0,3,2), (0,0,2), (3,0,2) and (3,3,2).

TABLE 3

```
//Filter function
    function obj__in__table(obj)
        // loop through the four sides of the table
        for sides = 0,.., 3 do
            // build an edge from the table sides based
            // on the current corner in the loop
            edge = make__edge(tablecorners[sides],
                tablecorners[sides+1 % 4])
            // Test if the object is "inside" of the
            // edge. If the object is not "inside,"
            // false is returned right away since the
            // object is outside the table. This object
            // will be filtered out and not sent to
            // a subscribing module.
            if (objectinside(obj,edge) == false)
                return false;
        end
        // If we got to this part of the code, the object
        // must be inside the table. True is returned and
        // this object is sent to the subscribing module.
```

Method of Controlling Robot Using Blackboard System

Figure 5A:
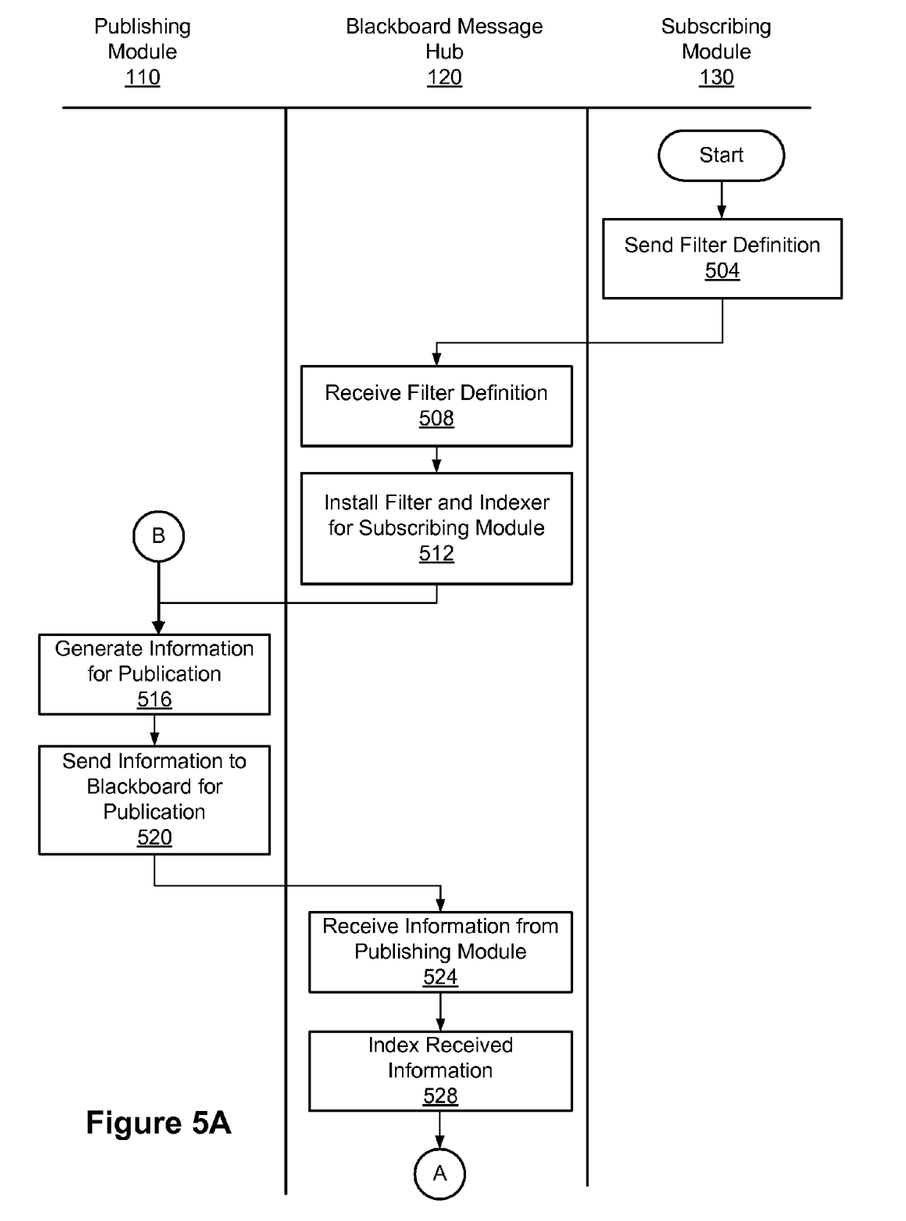
FIGS. 5A and 5B are flow charts illustrating a method of controlling a robot according to one embodiment.
Figure 5B:
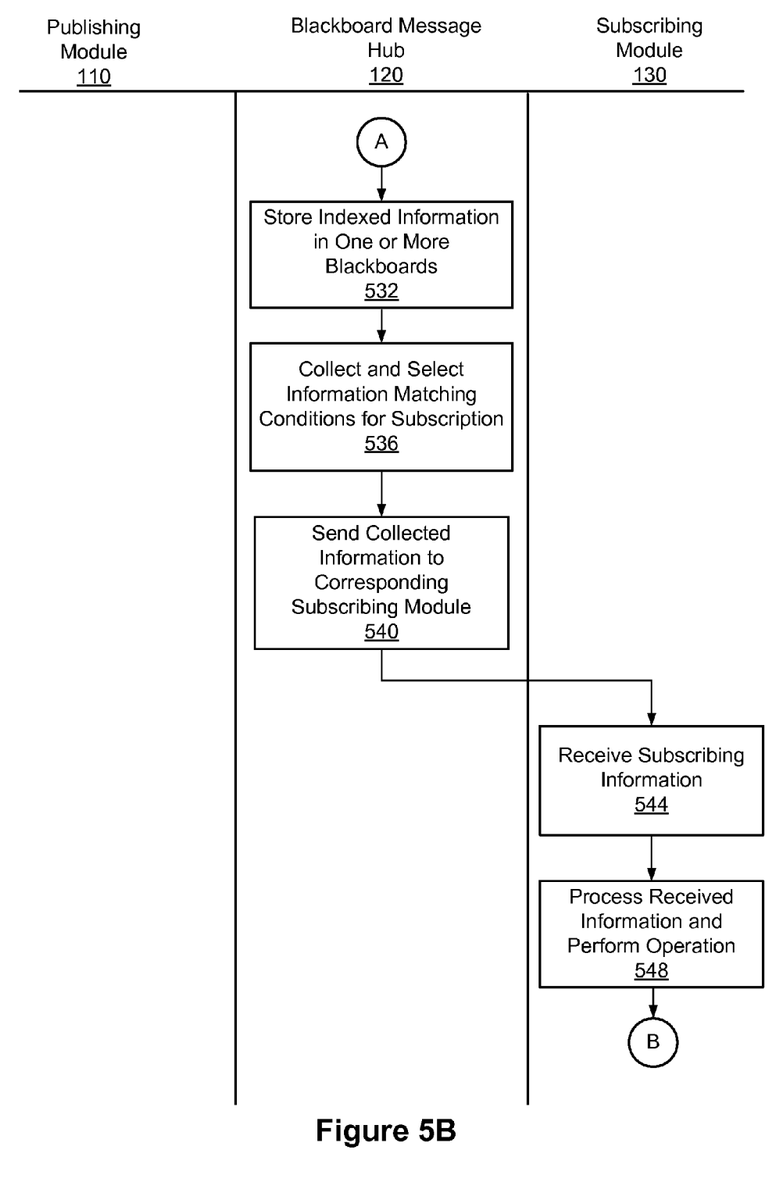

FIGS. 5A and 5B are flow charts illustrating a method of controlling a robot 100 using a blackboard system according to one embodiment. After a subscribing module 130 is installed on the blackboard system, the subscribing module 130 sends 504 a filter definition 444 to the blackboard message hub 120. The blackboard message hub 120 receives 508 the filter definition 444 from the subscribing module 130. The blackboard message hub 120 installs 512 filters 310 and indexers 302 for the subscribing module 130. Specifically, the blackboard message hub 120 parses the filter definition 444 received from the subscribing module 130, and installs a filter 310 associated with the subscribing module 130. If an indexer is already available to provide the indexing as required by the newly installed filter, the generation and installation of a new indexer may be omitted.

The publishing module 110 generates 516 information for publication. The information is included in a message and then sent 520 to the blackboard message hub 120. The message including the information to be published is received 524 at the blackboard message hub 120. The indexers 302 of the blackboard message hub 120 indexes 528 the received information and stores 532 the indexed information in one or more blackboards 248, 252. The filters 310 installed on the blackboard message hub 120 collects and selects 536 a subset of information stored in the blackboards 248, 252 as the subscribed information. The subscribed information is included in a message and then sent 540 to a subscribing module 130.

The subscribing module 130 receives 544 the message including the subscribed information from the blackboard message hub 120. The subscribed information is then processed 548 at the subscribing module 130 to generate an output. The generated output from the subscribing module may then be used to control the effectors of the robot 100 or again be published on the blackboard message hub 120 to become part of information subscribed by other subscribing modules 130. The process then returns to the step of generating information for publication at the publishing module 110. Also, when a new subscribing module is added, the steps 504 through 512 may be repeated for the added subscribing module.

Although the embodiments of FIGS. 5A and 5B are described herein using only one publishing module and one subscribing module for the sake of brevity, multiple publishing modules and subscribing modules may operate in the same process as described in FIGS. 5A and 5B.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A distributed system based on a publish-subscribe architecture for controlling a robot, comprising:
    a plurality of publishing modules configured to generate information for sharing with other modules;
    a first subscribing module configured to generate a first output for performing a first task in the robot including control of effectors of the robot based on the information generated by the plurality of the publishing modules;
    a second subscribing module configured to generate a second output for performing a second task in the robot based on the information generated by the plurality of the publishing modules; and
    a message hub separate from the plurality of publishing modules and configured to receive and store the information generated by the plurality of publishing modules, the message hub comprising a plurality of shared memory parts for storing different types of information, the message hub installed with a plurality of filters comprising at least a first filter and a second filter described in a procedural language to implement branching, loop and recursion operations in the first filter and the second filter, the first filter configured to select a first subset of the information matching a first condition for sending to the first subscribing module in one or more first messages identifying the plurality of shared memory parts which store the first subset of the information, the second filter configured to select a second subset of the information matching a second condition for sending to the second subscribing module in one or more second messages identifying the plurality of shared memory parts which store the second subset of the information.

2. The distributed system of claim 1, wherein the the procedural language is a scripting language.

3. The distributed system of claim 1, wherein the message hub further comprises a blackboard manager for classifying and indexing the received information into different types of information for storing in different ones of the plurality of shared memory parts.

4. The distributed system of claim 1, wherein the message hub further comprises a filter management module configured to install a filter based on a filter definition received from the first subscribing module or the second subscribing module.

5. The distributed system of claim 4, wherein the message hub further comprises a blackboard manager for classifying and indexing the received information, the blackboard manager installing an indexer corresponding to the filter responsive to receiving the filter definition.

6. The distributed system of claim 1, wherein the one or more messages are instantiated from extensible classes.

7. The distributed system of claim 1, wherein the message hub configured to change the first filter responsive to receiving a request for the first subscribing module to update the first filter.

8. The distributed system of claim 1, wherein the second subscribing module is configured to perform motion planning or extraction of objects from a video image.

9. The distributed system of claim 1, wherein the message hub is configured to remove the first filter responsive to removal of the first subscribing module.

10. The distributed system of claim 1, wherein the one or more first messages include fields for indicating prior messages associated with the one or more first messages.

11. A method for controlling a robot using a message hub in a distributed system, the distributed system based on a publish-subscribe architecture, comprising:
  installing a plurality of filters including a first filter and a second filter in the message hub;
  receiving information for sharing from a plurality of publishing modules to a message hub separate from the plurality of publishing modules;
  storing the received information in different ones of a plurality shared memory parts based on the type of information;
  selecting a first subset of the information matching a first condition by the first filter described in a procedural language to implement branching, looping operations in the first filter;
  selecting a second subset of the information matching a second condition by the second filter described in the procedural language;
  sending the first subset of the information to a first subscribing module for generating a first output associated with performing a first task in one or more first messages identifying the plurality of shared memory parts storing the first subset of the information, the first task including control of effectors of the robot; and
  sending the second subset of the information to a second subscribing module for generating a second output associated with performing a second task in one or more second messages identifying the plurality of shared memory parts storing the second subset of the information.

12. The method of claim 11, wherein the procedural language is a scripting language.

13. The method of claim 11, further comprising:
  receiving a filter definition from a first subscribing module; and
  generating a filter based on the filter definition for selecting the first subset of the information.

14. The method of claim 13, further comprising generating an indexer corresponding to the filter responsive to receiving the filter definition, the filter configured to classify and index the information for sharing.

15. The method of claim 11, further comprising changing the first filter responsive to receiving a request from the first subscribing module to update the first filter.

16. A non-transitory computer readable storage medium structured to store instructions executable by a processor in a message hub to control a robot using a distributed system based on a publish-subscribe architecture, the instructions, when executed cause the processor to:
  install a plurality of filters including a first filter and a second filter in the message hub;
  receive information for sharing from a plurality of publishing modules separate from the messaging hub;
  store the received information in different ones of a plurality shared memory parts based on the type of information;
  select a first subset of the information matching a first condition by the first filter described in a procedural language to implement branching, looping operations in the first filter;
  select a second subset of the information matching a second condition by the second filter described in the procedural language;
  send the first subset of the information to a first subscribing module for generating a first output associated with performing a first task in one or more first messages identifying the plurality of shared memory parts storing the first subset of the information, the first task including control of effectors of the robot; and
  send the second subset of the information to a second subscribing module for generating a second output associated with performing a second task in one or more second messages identifying the plurality of shared memory parts storing the second subset of the information.

17. The computer readable storage medium of claim 16, wherein the procedural language is a scripting language.

18. The computer readable storage medium of claim 16, further comprising instructions to:
  receive a filter definition from a first subscribing module; and
  generate a filter based on the filter definition for selecting the first subset of the information.

19. The distributed system of claim 18, further comprising instructions to install an indexer corresponding to the filter responsive to receiving the filter definition on the message hub, the indexer classifying and indexing the received information on the message hub.

20. The computer readable storage medium of claim 16, further comprising instructions to change the first filter to modify the first condition responsive to receiving a request from the first subscribing module to update the first filter.

* * * * *

UNITED STATES PATENT AND TRADEMARK OFFICE
CERTIFICATE OF CORRECTION

PATENT NO. : 9,079,306 B2
APPLICATION NO. : 12/252628
DATED : July 14, 2015
INVENTOR(S) : Ng-Thow-Hing et al.

It is certified that error appears in the above-identified patent and that said Letters Patent is hereby corrected as shown below:

On the title page, item (73), Assignee:

Delete "Honda Motor Co., Ltd., Tokyo (JP)" insert -- Honda Motor Co., Ltd., Tokyo (JP) and Communicative Machines, Inc., New York (NY) --.

Signed and Sealed this
Sixteenth Day of August, 2016

Michelle K. Lee
*Director of the United States Patent and Trademark Office*